(12) United States Patent
Kakimoto et al.

(10) Patent No.: US 8,223,605 B2
(45) Date of Patent: Jul. 17, 2012

(54) OPTICAL DISC RECORDING METHOD, OPTICAL DISC RECORDING/PLAYBACK DEVICE, AND OPTICAL DISC

(75) Inventors: Hiroya Kakimoto, Gunma (JP); Fuyuki Miyazawa, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 386 days.

(21) Appl. No.: 12/182,794

(22) Filed: Jul. 30, 2008

(65) Prior Publication Data

US 2009/0067306 A1 Mar. 12, 2009

(30) Foreign Application Priority Data

Jul. 31, 2007 (JP) .................................. 2007-198514

(51) Int. Cl.
*G11B 15/52* (2006.01)
(52) U.S. Cl. ...................................................... 369/47.5
(58) Field of Classification Search ............... 369/59.11, 369/59.12
See application file for complete search history.

(56) References Cited

U.S. PATENT DOCUMENTS

| | | | | |
|---|---|---|---|---|
| 4,509,156 A | * | 4/1985 | Ohara et al. ............. | 369/53.29 |
| 7,161,888 B2 | * | 1/2007 | Horikawa et al. ......... | 369/59.11 |
| 7,352,671 B2 | * | 4/2008 | Ando et al. ............... | 369/53.2 |
| 7,903,511 B2 | * | 3/2011 | Aoki et al. ................ | 369/47.5 |
| 8,121,003 B2 | * | 2/2012 | Kusanagi .................. | 369/47.51 |
| 2005/0007942 A1 | * | 1/2005 | Horai et al. ............... | 369/275.4 |
| 2006/0140097 A1 | | 6/2006 | Tasaka et al. | |
| 2008/0212453 A1 | * | 9/2008 | Miyazawa et al. ......... | 369/116 |
| 2009/0067306 A1 | * | 3/2009 | Kakimoto et al. ......... | 369/47.53 |
| 2009/0213708 A1 | * | 8/2009 | Kusanagi .................. | 369/47.5 |
| 2010/0315914 A1 | * | 12/2010 | Nakano et al. ........... | 369/47.5 |

FOREIGN PATENT DOCUMENTS

| | | |
|---|---|---|
| EP | 1933308 A | 6/2008 |
| JP | 2003-323717 | 11/2003 |
| JP | 2006-120199 A | 5/2006 |
| JP | 2008-305530 A | 12/2008 |

* cited by examiner

*Primary Examiner* — Mohammad Ghayour
*Assistant Examiner* — Parul Gupta
(74) *Attorney, Agent, or Firm* — Law Office of Katsuhiro Arai

(57) ABSTRACT

An optical disc recording method includes: determining that an optical disc to be recorded is an optical disc including a recording layer comprising organic dye; and controlling a laser such that space formation power Ps necessary for space formation is equal to or smaller than bias power Pbw. In a case wherein the relation of Ps<Pbw is satisfied, the relation between the asymmetry value, β value, and main power Pw includes substantial linearity. Accordingly, control of the main power Pw can be performed with the asymmetry value and β value as evaluation indexes, and accordingly, disturbance or the like can be readily handled.

13 Claims, 10 Drawing Sheets

OPTICAL DISC RECORDING METHOD, OPTICAL DISC RECORDING/PLAYBACK DEVICE, AND OPTICAL DISC

BACKGROUND OF THE INVENTION

1. Field of the Invention

The present invention relates to an art for appropriately subjecting an optical disc including a recording layer employing organic dye to data recording.

2. Description of the Related Art

For example, an optical disc for recording to which the Blu-ray standard (hereafter, abbreviated as "BD standard") has been applied includes a disc-shaped substrate having spiral-shaped guide grooves (also referred to as pregrooves) on one face, a reflecting layer formed on one face of the substrate, a recording layer formed on the reflecting layer, and an optically-transparent cover layer formed on the recording layer. With such an optical disc, a recording laser beam is irradiated onto the recording layer on the pregrooves, i.e., onto the grooves to form a mark, thereby recording data. The recording laser beam is irradiated with a multi-pulse-type recording pulse (write pulse) schematically illustrated in FIG. 3A, or with a single-pulse-type recording pulse in some cases. With regard to this recording pulse, space formation power Ps which is recording power necessary for space formation is employed at the time of space formation, and main power Pw is employed at the time of mark formation. Bias power Pbw is employed between the pulses of the top pulse and thereafter with a mark of 3 T or more, cooling pulse power Pc is employed after the final pulse of the mark. Here, with the recording pulse according to FIG. 3A, with formation of a mark of 3 T or more, in order to prevent disorder on the shape of the mark from occurring due to the accumulation of heat generated by the laser irradiation corresponding to each pulse, the bias power Pbw is set smaller than the space formation power Ps. Of such optical discs, with regard to an optical disc including a recording layer employing an inorganic material, upon recording being performed with established recording setting conditions, i.e., strategy, properties such as shown in FIG. 1 are obtained, for example. Specifically, the horizontal axis represents the main power (recording power at the time of mark formation) Pw, and the vertical axis on the left side represents DC jitter (%) (hereafter, abbreviated as DCJ), i.e., the level of positional and width irregularities when recording data is converted into a recording signal, and the vertical axis on the right side represents an asymmetry value (hereafter, abbreviated as "Asym" in the drawings). Note that DCJ is the standard deviation of the phase difference between a binary RF signal binarized from a RF signal and a clock signal generated from the binarized RF signal thereof. Also, the asymmetry value is an evaluation index representing the symmetry between the shortest recording mark and shortest space and the longest recording mark and longest space of a RF signal. Note that a β value may be employed instead of the asymmetry value. With the GND level as reference wherein AC coupling, i.e., the DC components of the RF signal are removed, if we say that the difference between the amplitude and GND level of the longest recording mark M8T is a, and the difference between the amplitude and GND level of the longest space S8T is b, the β value is a numeric value (hereafter, referred to as "β value") computed with $\beta=(a-b)/(a+b)$.

As shown in FIG. 1, DCJ represents a curve such as a quadratic function wherein the DCJ becomes the minimum at a Pw of around 5.4 mW, and the asymmetry value increases generally in a linear manner as the main power Pw increases.

With regard to an optical disc employing an inorganic material, in a case wherein there is a problem when detecting the asymmetry value or β value, the main power Pw is adjusted in accordance with the curve such as shown in FIG. 1, whereby a desired asymmetry value or β value can be obtained. Accordingly, for example, with working optimum power control (hereafter, abbreviated as WOPC) during operation or the like, control of the main power PW is performed with the asymmetry value as an evaluation index, whereby irregularities relating to a disc itself such as the film thickness, reflecting film thickness, plate thickness, warping, and so forth of a recording material, or irregularities relating to change in temperature of a laser diode, a drive such as servo operation, or the like, can be handled.

On the other hand, with regard to an optical disc including a recording layer employing organic dye, upon recording being performed with established strategy or the like, properties such as shown in FIG. 2 are obtained, for example. The horizontal axis and vertical axes are similar to those in FIG. 1. In the case of organic dye as well, DCJ represents a curve such as a generally quadratic function in the same way as with the case of an inorganic material though the values are different, but with regard to the asymmetry value, we cannot find linearity such as shown in FIG. 1 in the case of an inorganic material. That is to say, with the asymmetry value and β value, this state is a state wherein determination cannot be made whether or not the appropriate main power Pw is set.

Note that with Japanese Unexamined Patent Application Publication No. 2003-323717, technology has been disclosed wherein, in order to improve recording precision while suppressing influence of heat accumulation and thermal diffusion on the recording face of an optical information recording medium with an optical information recording device for irradiating a recording pulse onto a recording information recording medium, when a recording mark is formed on the optical information recording medium to record information, the power of a recording pulse is changed between write power Pw and bias power Pbw necessary for forming a recording mark, thereby decreasing the bias power Pbw as compared to read power Pr necessary for playing the recording mark. Note however, this technology does not enable the above-mentioned problem to be solved.

As described above, when employing an optical disc employing organic dye, employment of established write strategy has a problem in that various irregularities such as described above cannot be handled with the asymmetry value or β value as an evaluation index.

Further, in a case wherein the detection precision of the asymmetry value or β value is low, there is a need to increase the tilt of a straight line representing the relation between the asymmetry value or β value and the main power Pw. Also, there is a need to maintain the linearity of the straight line representing the relation between the asymmetry value or β value and the main power Pw.

SUMMARY OF THE INVENTION

Accordingly, it is an object of the present invention to enable an optical disc including a recoding layer employing organic dye to be subjected to recording with excellent recording quality. That is to say, technology for enabling the relation between the asymmetry value or β value and the main power Pw to be represented with an appropriate straight line is employed, thereby subjecting the relevant optical disc to data recording with excellent quality.

Also, it is another object of the present invention to provide technology for maintaining the linearity of the straight line representing the relation between the asymmetry value or β value and the main power Pw at the time of subjecting an optical disc including a recording layer employing organic dye to recording.

An optical disc recording method according to a first aspect of the present invention includes: a determining step for determining whether an optical disc to be recorded is an optical disc including a recording layer employing organic dye; and a control step for controlling a laser such that space formation power Ps necessary for space formation is equal to or smaller than bias power Pbw, in a case wherein determination is made that the optical disc includes a recording layer employing organic dye. According to the surprising findings of the present inventor, in a case wherein a relation such as Ps≦Pbw is satisfied, the relation between the asymmetry value or β value and the main power Pw enhances the linearity. Accordingly, the main power Pw can be controlled with the asymmetry value or β value as an evaluation index, and accordingly, various irregularities relating to an optical disc itself to be subjected to data recording, and recording can be readily handled. That is to say, an optical disc employing organic dye can be subjected to appropriate data recording.

Note that the control step may be executed in a case wherein the recording speed is ×2 or faster. With the BD standard, with regard to a recording speed of ×1 it is stipulated that Ps>Pbw, so in the case of the BD standard, the control step needs to be performed regarding a recording speed that is ×2 or faster.

An optical disc recording/playback device according to a second aspect of the present invention includes: a unit configured to determine whether or not an optical disc to be written is an optical disc including a recording layer employing organic dye; and a control unit configured to control a laser such that space formation power Ps necessary for space formation is equal to or smaller than bias power Pbw, in a case wherein determination is made that the optical disc includes a recording layer employing organic dye. The parameters for determining Ps and Pbw may be stored in memory of the optical disc recording/playback device in some case.

An optical disc including a recording layer employing organic dye according to a third aspect of the present invention stores the parameters satisfying the following relation $$\epsilon_{ps} \leq \epsilon_{bw},$$

where $\epsilon_{ps}$ represents a parameter for setting space formation power Ps necessary for forming space in the relevant optical disc is, and $\epsilon_{bw}$ represents a parameter for setting bias power Pbw. Thus, the parameters for the relevant optical disc are stored in an optical disc to be subjected to data recording, whereby appropriate recording can be performed even with any optical disc recording/playback device.

The parameter $\epsilon_{ps}$ and the parameter $\epsilon_{bw}$ may be parameters employed at a recording speed of ×2 or faster.

Further, the parameter $\epsilon_{ps}$ and the parameter $\epsilon_{bw}$ may be parameters to be multiplied by a mark formation power PW necessary for forming a mark in the optical disc. There is a case wherein adjustment is restricted to Ps=Pw×$\epsilon_{ps}$, Pbw=Pw×$\epsilon_{bw}$ depending on an optical disc recording/playback device, and the present invention can also handle such a restricted case.

An optical disc recording method according to a fourth aspect of the present invention includes: a determining step for determining whether an optical disc to be recorded is an optical disc including a recording layer employing organic dye; a first recording step for performing data recording employing space formation power $Ps_1$ necessary for space formation at a recording speed of ×1 and bias power $Pbw_1$ at a recording speed of ×1, in a case wherein determination is made that the optical disc is an optical disc including a recording layer employing organic dye, and also a recording speed is ×1; and a second recording step for performing data recording employing space formation power $Ps_2$ necessary for space formation at the relevant recording speed and bias power $Pbw_2$ at the relevant recording speed, in a case wherein determination is made that the optical disc is an optical disc including a recording layer employing organic dye, and also a recording speed is ×2 or faster; with $Ps_1$, $Pbw_1$, $Ps_2$, and $Pbw_2$ being set so as to satisfy the following condition $$Ps_1/Pbw_1 > Ps_2/Pbw_2.$$

According to the surprising findings of the present inventor, in the case of the above-mentioned condition being satisfied, the relation between the asymmetry value or β value and the main power Pw has the linearity. Accordingly, the main power Pw can be controlled with the asymmetry value or β value as an evaluation index, and accordingly, various irregularities relating to an optical disc itself to be subjected to data recording, and recording can be readily handled. That is to say, an optical disc including a recording layer employing organic dye can be subjected to appropriate data recording.

An optical disc recording/playback device according to a fifth aspect of the present invention includes: a determining unit configured to determine whether or not an optical disc to be written is an optical disc including a recording layer employing organic dye; and a control unit configured to perform control so as to satisfy the following relation $$Ps_1/Pbw_1 > Ps_2/Pbw_2$$

where $Ps_1$ is space formation power necessary for space formation at a recording speed of ×1, $Pbw_1$ is bias power at a recording speed of ×1, $Ps_2$ is space formation power necessary for space formation at a recording speed of ×2 or faster, and $Pbw_2$ is bias power at a recording speed of ×2 or faster, in a case wherein determination is made that the optical disc is an optical disc including a recording layer employing organic dye. The parameters for setting the above-mentioned power may be stored in memory of the optical disc recording/playback device.

An optical disc including a recording layer employing organic dye according to a sixth aspect of the present invention stores the parameters satisfying the following relation $$\epsilon_{ps1}/\epsilon_{bw1} \geq \epsilon_{ps2}/\epsilon_{bw2},$$

where $\epsilon_{ps1}$ is a parameter for setting space formation power $Ps_1$ necessary for space formation at a recording speed of ×1, $\epsilon_{bw1}$ is a parameter for setting bias power $Pbw_1$ at a recording speed of ×1, $\epsilon_{ps2}$ is a parameter for setting space formation power $Ps_2$ necessary for space formation at a recording speed of ×2 or faster, and $\epsilon_{bw2}$ is a parameter for setting bias power $Pbw_2$ at a recording speed of ×2 or faster. Thus, the parameters for the relevant optical disc are stored in the optical disc, whereby appropriate recording can be performed even with any optical disc recording/playback device.

An optical disc recording method according to a seventh aspect of the present invention includes: a determining step for determining whether an optical disc to be recorded is an optical disc including a recording layer employing organic dye; a first recording step for performing data recording employing bias power $Pbw_1$ at a recording speed of ×1, in a case wherein determination is made that the optical disc is an optical disc including a recording layer employing organic dye, and also a recording speed is ×1; and a second recording step for performing data recording employing bias power $Pbw_2$ at the relevant recording speed, in a case wherein determination is made that the optical disc is an optical disc including a recording layer employing organic dye, and also a recording speed is ×2 or faster; with the $Pbw_1$ and $Pbw_2$ being set so as to satisfy the following relation $$Pbw_1 < Pbw_2.$$

According to the surprising findings of the present inventor, in the case of the above-mentioned condition being satisfied, the relation between the asymmetry value or β value and the main power Pw has the linearity. Accordingly, the main power Pw can be controlled with the asymmetry value or β value as an evaluation index, and accordingly, various irregularities relating to an optical disc itself to be subjected to data recording, and recording can be readily handled. That is to say, an optical disc including a recording layer employing organic dye can be subjected to appropriate data recording.

An optical disc recording/playback device according to an eighth aspect of the present invention includes: a determining unit configured to determine whether or not an optical disc to be written is an optical disc including a recording layer employing organic dye; and a control unit configured to perform control so as to satisfy the following relation $$Pbw_1 < Pbw_2$$

wherein $Pbw_1$ is bias power at a recording speed of ×1, and $Pbw_2$ is bias power at a recording speed of ×2 or faster, in a case wherein determination is made that the optical disc includes a recording layer employing organic dye. The parameters for setting the above-mentioned power may be stored in memory of the optical disc recording/playback device.

An optical disc including a recording layer employing organic dye according to a ninth aspect of the present invention stores the parameters satisfying the following relation $$\epsilon_{bw1} < \epsilon_{bw2},$$

where $\epsilon_{bw1}$ is a parameter for setting bias power $Pbw_1$ at a recording speed of ×1, and $\epsilon_{bw2}$ is a parameter for setting bias power $Pbw_2$ at a recording speed of ×2 or faster. Thus, the parameters for the relevant optical disc are stored in the optical disc, whereby appropriate recording can be performed even with any optical disc recording/playback device.

A program for causing a processor to execute the optical disc recording method of the present invention can be created, and the relevant program is stored in, for example, a recording medium such as a flexible disk, optical disc such as CD-ROM, magneto-optical disk, semiconductor memory, hard disk, or the like, storage device, or nonvolatile memory of a processor. Also, the program may be distributed with a digital signal over a network. Note that data being processed is temporarily stored in a storage device such as memory of a processor or the like.

According to a feature of the present invention, when subjecting an optical disc including a recording layer employing organic dye to recording, the tilt and linearity of the relation between the asymmetry value or β value and the main power Pw is enhanced, and the relevant optical disc can be subjected to data recording with excellent quality at a high speed such as ×2 speed.

Also, according to another feature of the present invention, when subjecting an optical disc including a recording layer employing organic dye to recording, the parameter information of the linearity of a straight line representing the relation between the asymmetry value or β value and the main power Pw can be held in the memory of the optical disc recording/playback device, an optical disc itself, or the like.

DETAILED DESCRIPTION OF THE PREFERRED EMBODIMENT

Figure 3A:
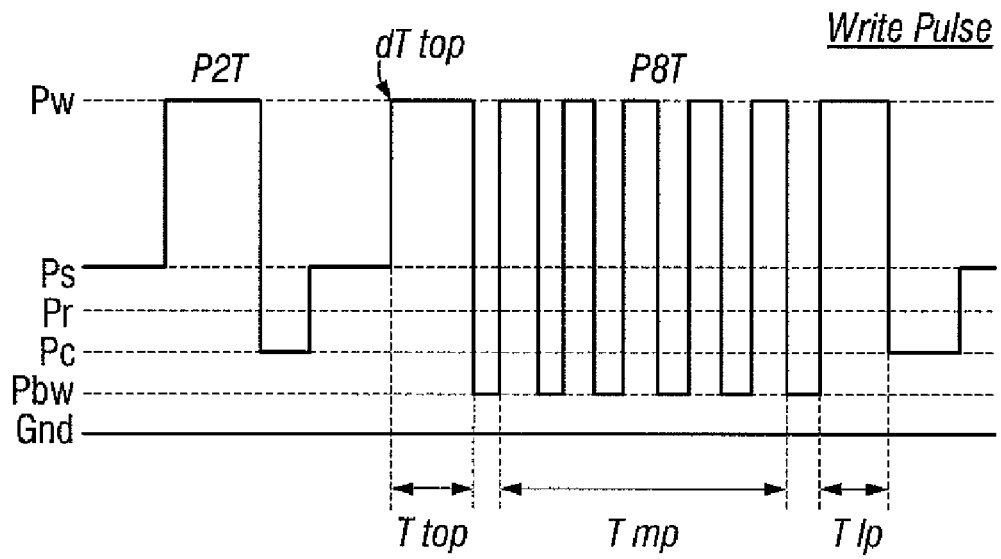
FIG. 3A is a diagram for describing the waveform of recording power according to the related art.
Figure 3B:
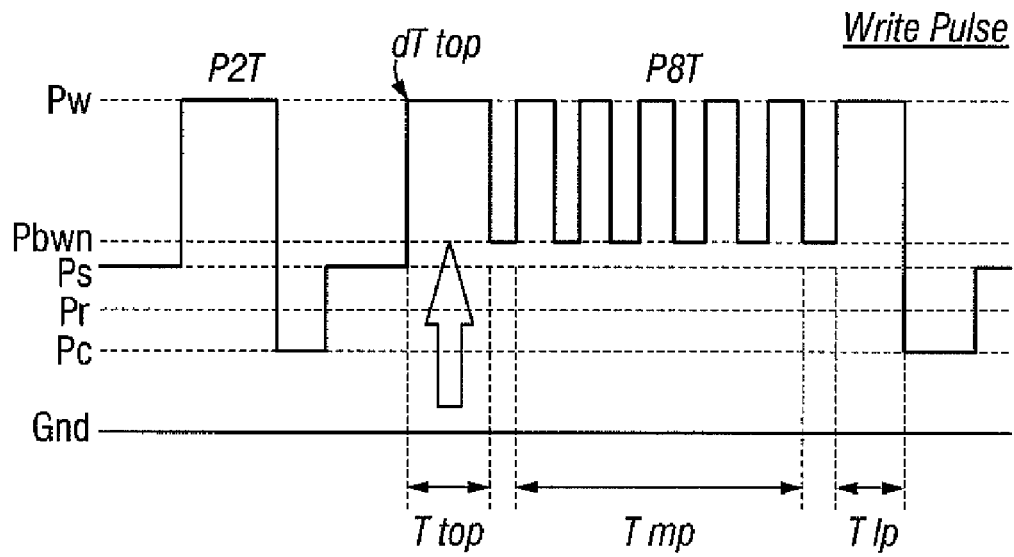
FIG. 3B is a diagram for describing the waveform of recording power according to one embodiment.
Figure 4:
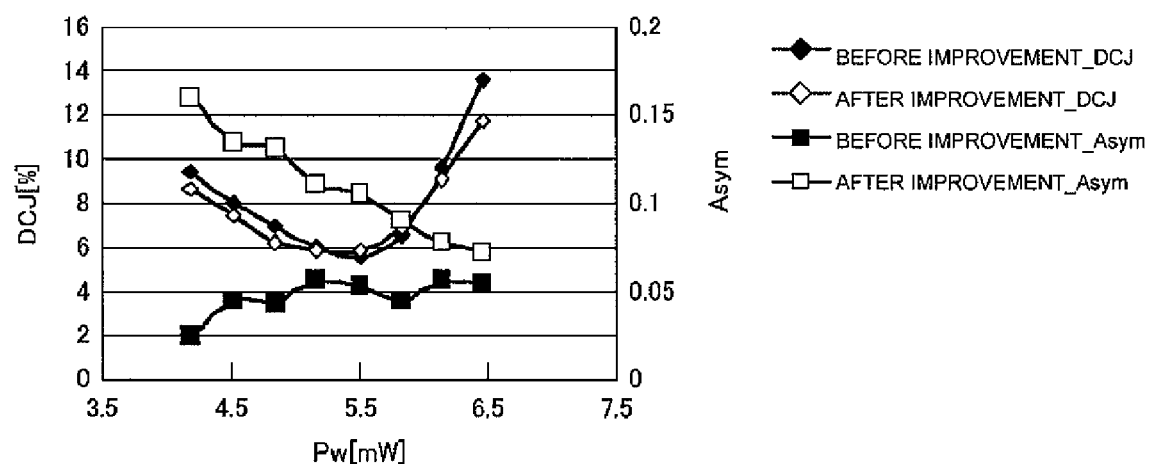
FIG. 4 is a diagram illustrating an improvement level of a curve representing the relation between the main power Pw and asymmetry value in a case wherein bias power Pbw is increased.

The present inventor has surprisingly found that in the case of an optical disc including a recording layer employing organic dye, the power level of the bias power Pbw is changed from control such as a pulse waveform shown in FIG. 3A to the power level of bias power Pbwn such as a pulse waveform shown in FIG. 3B, i.e., the power level of the bias power Pbw is increased up to equal or greater than the power level of the space formation power Ps, in contrast to the related art, whereby the asymmetry value and main power Pw have at least substantial linearity such as shown in FIG. 4. Note that the reason why the bias power is indicated as Pbwn in FIG. 3B is to clarify how the bias power Pbw according to the related art increases to the increased bias power denoted with a symbol of Pbwn. However, the bias power according to the invention may also generally be described with a symbol of Pbw with the description below.

Particularly, it is generally desirable to increase the bias power Pbwn as compared to read power Pr at the time of playback. However, in a case wherein a condition such as recording device or the like differs, this relation does not hold in some cases, so caution is necessary.

In FIG. 4, the horizontal axis represents the main power Pw, the vertical axis on the left side represents DCJ (%), and the vertical axis on the right side represents the asymmetry value Asym. There is no great difference between DCJ before improvement, i.e., DCJ in the case of the bias power Pbw according to the related art, and DCJ after improvement, i.e., DCJ in the case of the level of the bias power Pbw being increased. Deterioration in recording quality is almost not seen, and after improvement, a relation is seen wherein when the main power Pw increases, the asymmetry value Asym decreases.

Figure 1:
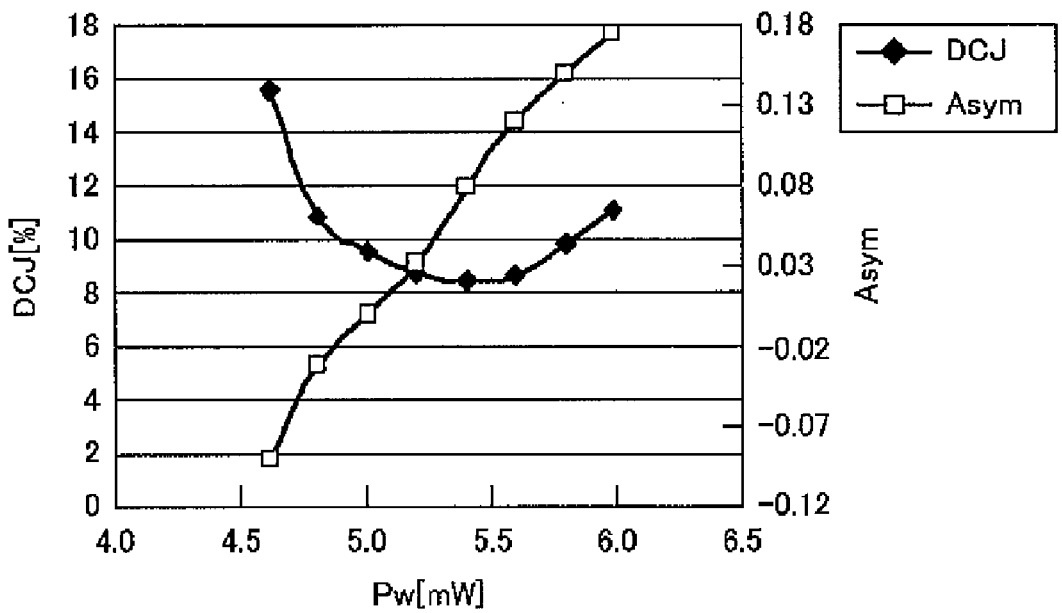
FIG. 1 is a diagram representing the relation between the main power Pw, DCJ, and asymmetry value of an optical disc including a recording layer employing an inorganic material.
Figure 2:
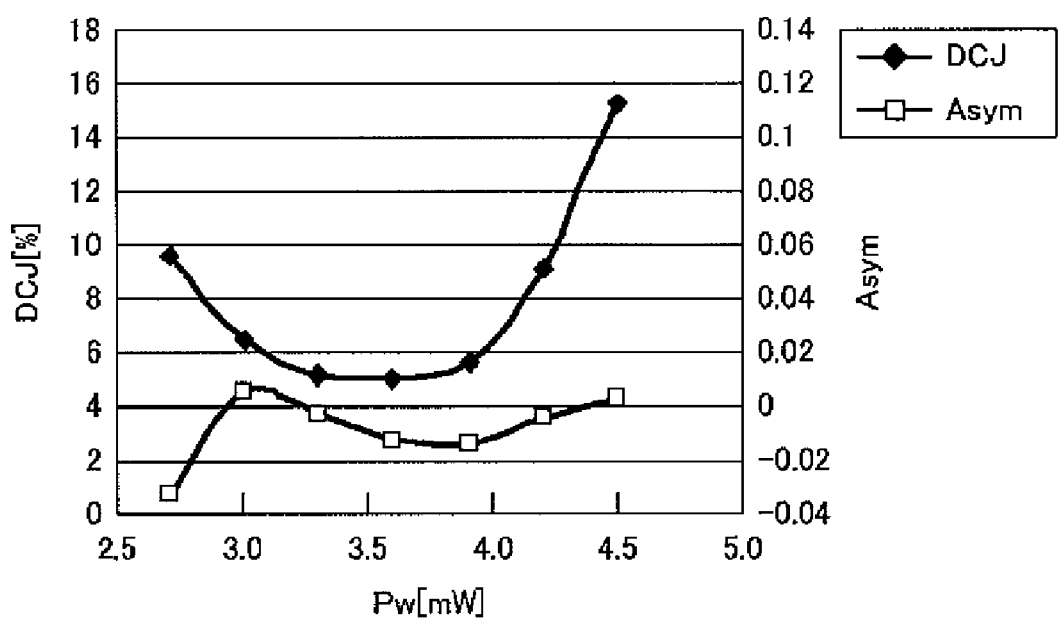
FIG. 2 is a diagram representing the relation between main power Pw, DCJ, and asymmetry value of an optical disc including a recording layer employing organic dye in a case wherein measurement was performed employing strategy data according to the related art.

Note that in the case of an inorganic material, the polarity is high-to-low, so a straight line is drawn upward slanting to the right as the asymmetry value Asym, such as shown in FIG. 1, but in the case of an optical disc employing organic dye, where the polarity is low-to-high, a straight line is drawn downward slanting to the right as the asymmetry value Asym, such as shown in FIG. 4.

An embodiment of the present invention is characterized in employing a write strategy wherein the space formation power Ps is equal to or smaller than the bias power Pbw to subject an optical disc to data recording. Also, the embodiment is characterized in adjusting a recording system so as to readily reference the parameters for power control serving as such a write strategy. Note that the space formation power Ps is set somewhat smaller than a general power level according to the related art, which becomes a peripheral factor of the present embodiment.

Figure 5:
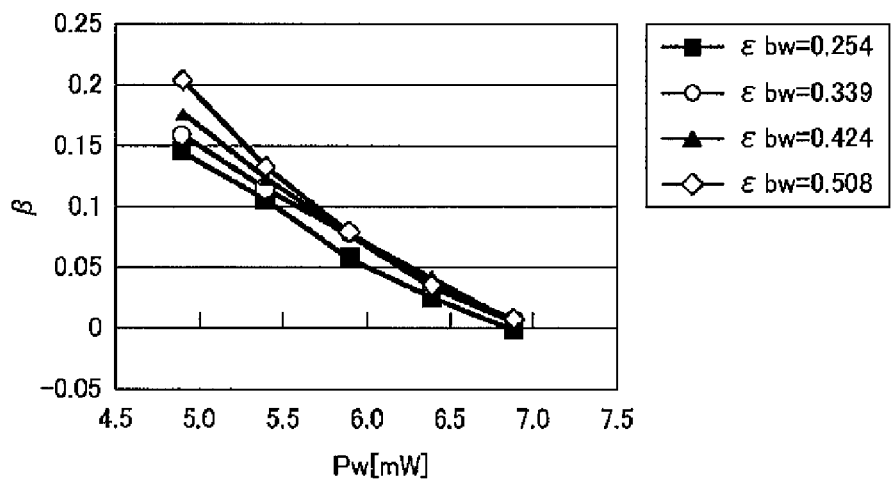
FIG. 5 is a diagram for describing the relation between the main power Pw and β value in a case wherein the bias power Pbw according to the present invention is changed.

More detailed data is shown in FIG. 5 as an embodiment of the present invention in the case of employing a recording speed of ×2. FIG. 5 illustrates the relation between the β value and main power Pw of each case of $\epsilon_{bw}$=0.254, $\epsilon_{bw}$=0.339, $\epsilon_{bw}$=0.424, and $\epsilon_{bw}$=0.508 when setting Pbw=Pw×$\epsilon_{bw}$. As can be understood from FIG. 5, in any case, the relation between the β value and main power Pw can be generally approximated to a linear function.

Figure 6:
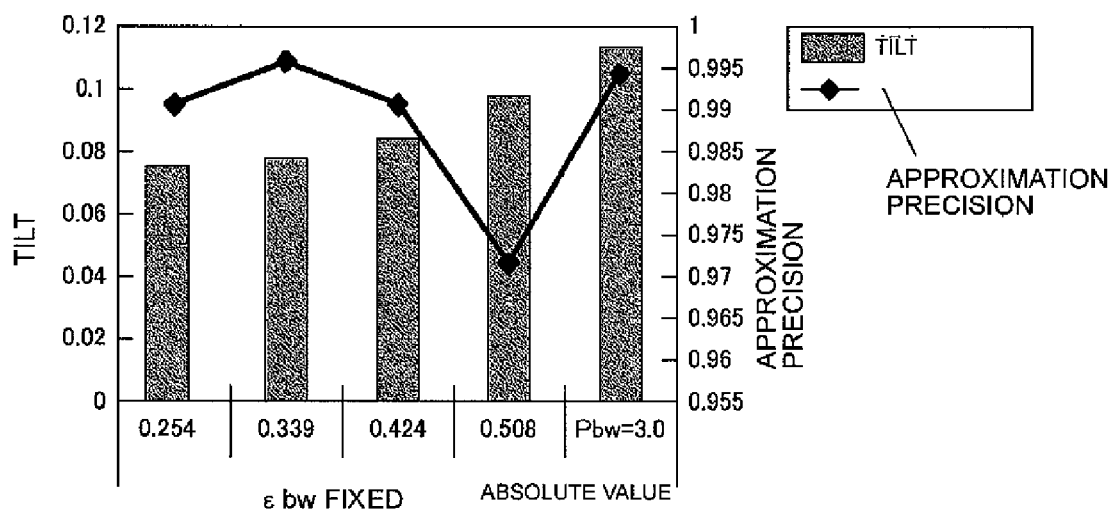
FIG. 6 is a diagram for comparing a case wherein $\epsilon_{bw}$ is changed, and a case wherein the bias power Pbw is fixed regarding the linear tilt and linear approximation precision representing the relation between the main power Pw and β value according to the present invention.

Further detailed data is shown in FIG. 6 as an embodiment of the present invention in the case of employing a recording speed of ×2. In FIG. 6, the horizontal axis represents $\epsilon_{bw}$ or Pbw, the vertical axis on the left represents the scales of bar graphs, and also represents the absolute value of the tilt of each straight line in FIG. 5, the vertical axis on the right represents the scale of a polygonal line graph, and also represents approximate accuracy σ of each straight line. As can be understood from FIG. 6, as $\epsilon_{bw}$ increases, the tilt of the corresponding straight line increases.

Further, a greater tilt can be obtained in the case of fixing Pbw to 3.0 mW. The greater the tilt is, the more recording power can be readily controlled to obtain an appropriate value even if the detection precision of the β value is low, so it may be desirable to set Pbw to not Pw×$\epsilon_{bw}$ but a fixed value wherein an independent power level of bias power Pbw is set without operating simultaneously with write power Pw.

Note that a control method such as Pbw=Pw×$\epsilon_{bw}$+α may be employed. The value of α in this case is set to a great value, whereby the influence due to operating simultaneously with write power Pw is reduced, which is equivalent to the case of setting Pbw to a fixed value in a pseudo manner.

Particularly, in the case of setting Pbw to 3.0 mW fixedly, the linear approximate accuracy σ is a great value, which is more desirable. However, such setting cannot be performed depending on an optical disc recording/playback device currently offered commercially in some cases. Therefore, an experimental fact has been described regarding fixing Pbw.

On the other hand, it can be found that when $\epsilon_{bw}$ increases, the linear approximate accuracy σ deteriorates. This can be considered as a phenomenon caused by a long mark being recorded too strongly when the bias power Pbw increases excessively. Accordingly, with this state as it is, $\epsilon_{bw}$ cannot be increased for the sake of the linear approximate accuracy σ, and the tilt of a line cannot be increased sufficiently.

Figure 7:
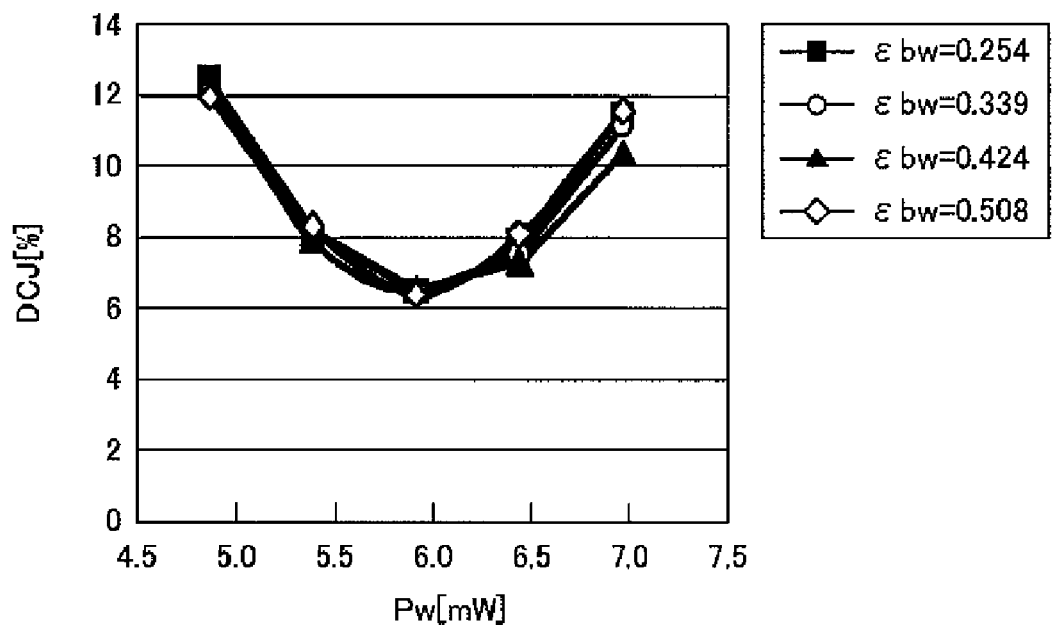
FIG. 7 is a diagram for describing the relation between the main power Pw and DCJ in a case wherein the bias power Pbw according to the present invention is changed.

Note that FIG. 7 illustrates the relation between DCJ and main power Pw. In FIG. 7, the horizontal axis represents the main power Pw, and the vertical axis represents DCJ. The curve of DCJ can be prevented from being changed even if $\epsilon_{bw}$ is changed, so it can be found that an advantage obtained by increasing $\epsilon_{bw}$ is great. However, for example, with the write strategy such as shown in FIG. 3, in a case wherein the power level of the bias power Pbw is increased to Pbwn, there is a need to adjust heat balance by narrowing down at least one of intermediate pulse width Tmp and final pulse width Tlp (3 T).

Now, the present inventor has found as a non-evident matter that the power level of the space formation power Ps is decreased from the ordinary power level as a method for improving the linearity, i.e., the linear approximate accuracy σ. For example, only the top pulse start position dTtop of top pulse width Ttop of a mark equal to or longer than 3 T is delayed to narrow down the substantial width so as to be in conjunction with this control. Such control improves the heat balance of each mark when setting the write power Pw high. Note that symbols relating to write strategy have been described on the premise of the symbols shown in FIGS. 3A and 3B.

Figure 8:
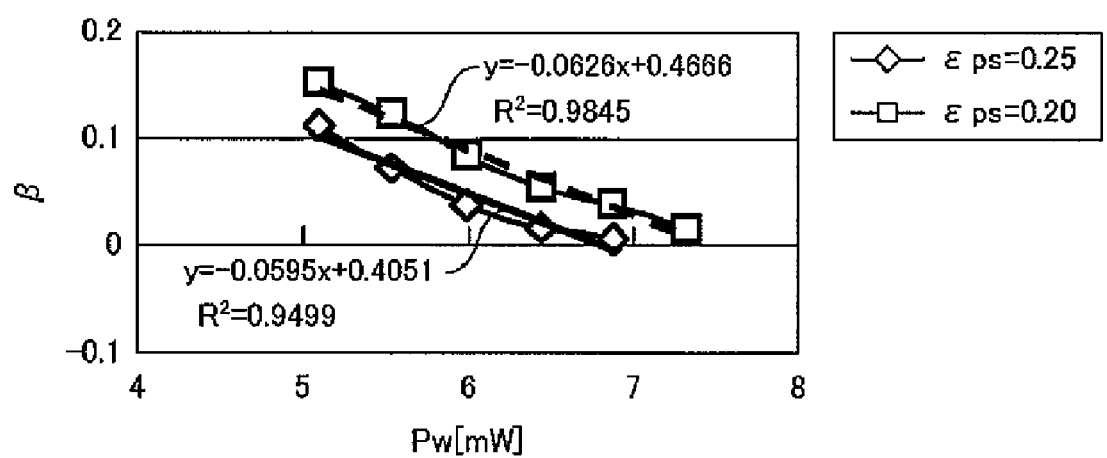
FIG. 8 is a diagram for describing the relation between the main power Pw and β value in a case wherein space formation power Ps according to the present invention is decreased.

This advantage is shown in FIG. 8. In FIG. 8, in a case wherein the space formation power Ps is calculated with $\epsilon_{ps}$×Pw, the property relations between the main power Pw and β value in cases of $\epsilon_{ps}$=0.25 and $\epsilon_{ps}$=0.20 are represented with a primary approximation mathematical expression. Note that with $\epsilon_{bw}$=0.5, a recording speed is ×2. In FIG. 8, the horizontal axis represents the main power Pw, and the vertical axis represents β. As can be understood from FIG. 8, the linear approximate accuracy ($R^2$ here) improves, and the value of the tilt increases in the case of $\epsilon_{ps}$=0.20 as compared to those in the case of $\epsilon_{ps}$=0.25.

Figure 9:
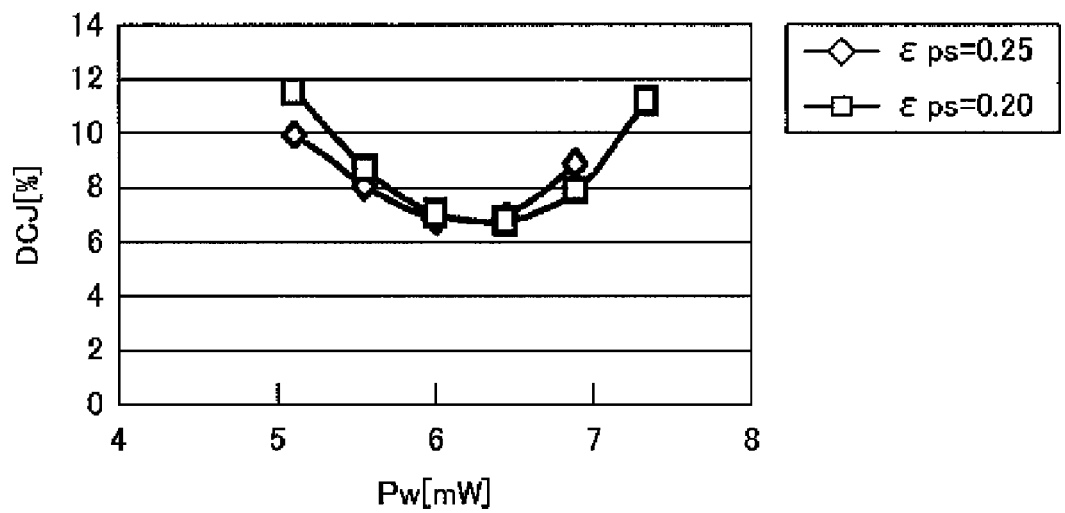
FIG. 9 is a diagram for describing the relation between the main power Pw and DCJ in a case wherein the space formation power Ps is decreased.

Also, FIG. 9 illustrates the relation between the main power Pw and DCJ. Also, in this case as well, with $\epsilon_{bw}$=0.5, a recording speed is ×2. In FIG. 9, the horizontal axis represents the main power Pw, and the vertical axis represents DCJ. As can be understood from FIG. 9, the curve of DCJ in the case of $\epsilon_{ps}$=0.20 somewhat differs from that in the case of $\epsilon_{ps}$=0.25, but there is no great deterioration.

As described above, it can be found that it is effective to decrease $\epsilon_{ps}$ while increasing $\epsilon_{bw}$. This is synonymous with decreasing Ps while increasing Pbw.

Further, in a case wherein a recording speed is ×1, Pbw<Ps is stipulated with the BD standard, but in a case wherein a recording speed is ×2 or faster, the relation between Pbw and Ps has not been stipulated. The case shown in FIG. 8 is ×2 speed recording, and it can be found that the relations of Pbw≧Ps and $\epsilon_{bw}$>$\epsilon_{ps}$ hold. That is to say, in a case wherein a recording speed is ×2 or faster, it can be found that with regard to the relation between Pbw and Ps, the conditions completely contrary to the time of ×1 speed are more preferred. Note that with the BD standard, ×1 speed is linear velocity of 4.92 m/s, and in the case of ×2 speed, linear velocity becomes double that linear velocity, i.e., 9.84 m/s.

Next, let us consider the relation between a recording speed of ×1 and that of ×2. FIGS. 5 through 9 illustrate data in the case of ×2 speed. Note that in FIGS. 5 through 9, in the case of Pw=5.9 mW wherein DCJ becomes the minimum, Pbw=1.5 mW in the case of $\epsilon_{bw}$=0.254, Pbw=2.0 mW in the case of $\epsilon_{bw}$=0.339, Pbw=2.5 mW in the case of $\epsilon_{bw}$=0.424, and Pbw=3.0 mW in the case of $\epsilon_{bw}$=0.508. Also, in FIGS. 5 through 7, Ps=1.5 mW in the case of $\epsilon_{ps}$=0.254, and Pc=0.1 mW in the case of $\epsilon_c$=0.017.

Figure 10:
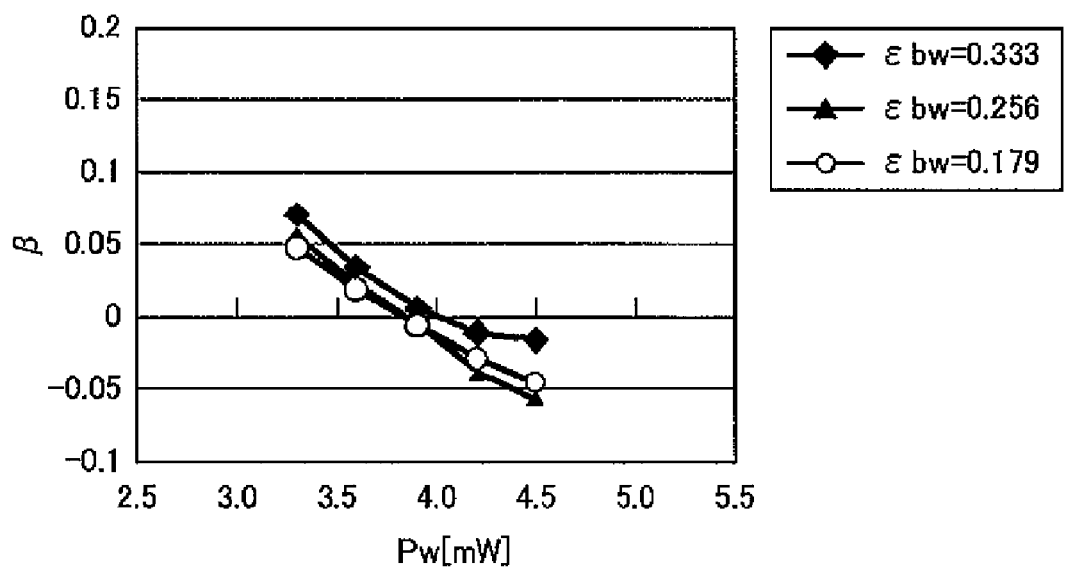
FIG. 10 is a diagram representing the relation between the main power Pw and β value in a case wherein $\epsilon_{bw}$ is changed at a recording speed of ×1.

On the other hand, in order to compare with a case wherein a recording speed is ×2, FIG. 10 illustrates the relation between the β value and main power Pw in a case wherein with a recording speed of ×1, in the case of $\epsilon_{ps}$=0.333, and $\epsilon_c$=0.256, and when changing $\epsilon_{bw}$ to $\epsilon_{bw}$=0.333, $\epsilon_{bw}$=0.256, and $\epsilon_{bw}$=0.179. In FIG. 10, the horizontal axis represents the main power Pw, and the vertical axis represents the β value. Thus, in any case as well, a curve is drawn downward slanting to the right, which can be subjected to linear approximation.

Figure 11:
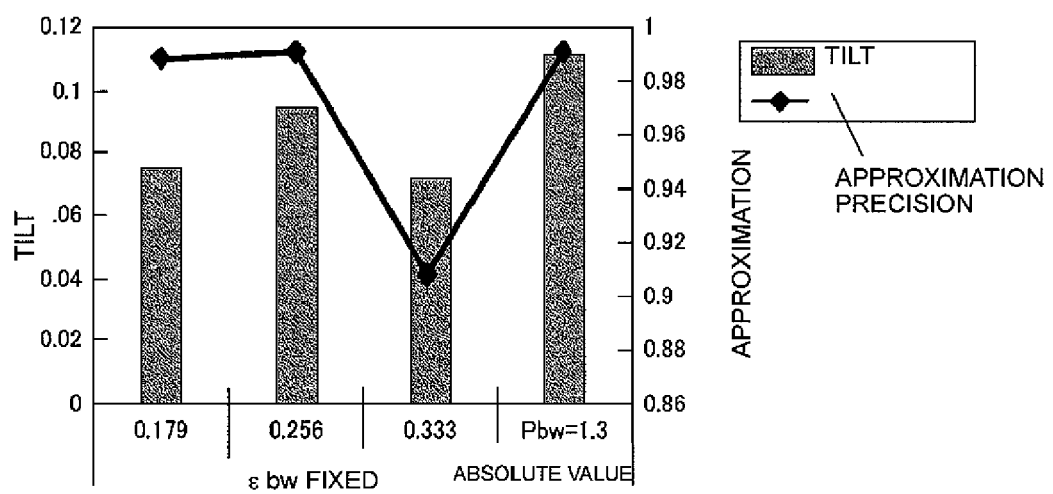
FIG. 11 is a diagram representing the linear tilt and linear approximation precision representing the relation between the main power Pw and β value in a case wherein $\epsilon_{bw}$ is changed, and in a case wherein Pbw is fixed, at a recording speed of ×1.

This can be understood from FIG. 11 as well. In FIG. 11, the horizontal axis represents $\epsilon_{bw}$ and Pbw, the vertical axis on the left represents the scales of bar graphs, and also represents the absolute value of the tilt of a straight line in FIG. 10, and the vertical axis on the right represents the scale of a polygonal line graph, and also represents approximate accuracy σ of each straight line in FIG. 10. In the case of ×1 speed, unlike the case of ×2 speed, when $\epsilon_{bw}$ becomes great excessively, the tilt becomes small, and also linear approximate accuracy σ deteriorates. Accordingly, $\epsilon_{bw}$ needs to be suppressed to around 0.256. However, it is desirable to fix Pbw in the same way as with the case of ×2 speed, like at Pbw=1.3 mW.

Figure 12:
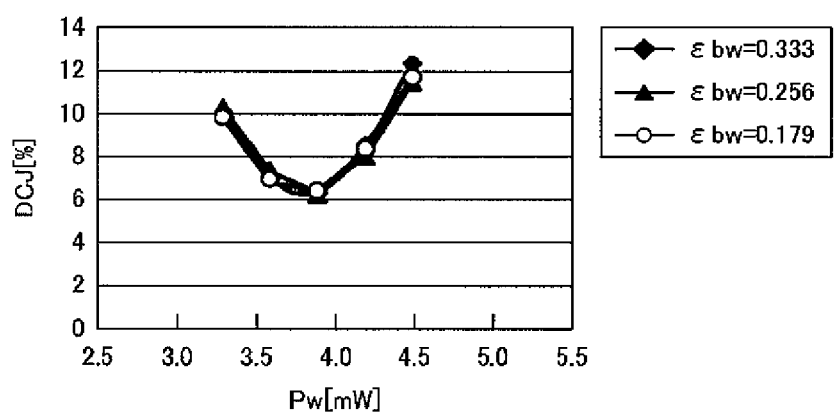
FIG. 12 is a diagram representing the relation between the main power Pw and DCJ in a case wherein $\epsilon_{bw}$ is changed at a recording speed of ×1.

In the same way as with the case of β in the above-mentioned FIG. 10, in order to compare with a case wherein a recording speed is ×2, FIG. 12 represents the relation between DCJ and main power Pw. As can be understood from FIG. 12, even if $\epsilon_{bw}$ changes, the curve of DCJ does not change at all. Also, it can be found that DCJ becomes the minimum in the case of Pw=3.9 mW. Note that at the time of Pw=3.9 mW, Pbw=0.7 mW in the case of $\epsilon_{bw}$=0.179, Pbw=1.0 mW in the case of $\epsilon_{bw}$=0.256, and Pbw=1.3 mW in the case of $\epsilon_{bw}$=0.333. Also, $\epsilon_{bw}$=0.333, so Ps=1.3 mW, and $\epsilon_{bw}$=0.026, so Pc=0.1 mw.

When DCJ is the minimum Pw, Ps1/Pbw1=1.3/1.0=1.3 at $\epsilon_{bw}$=0.256 which is a range wherein linearity is acceptable in the case of ×1 speed, but Ps2/Pbw2=1.5/2.5=0.6 at $\epsilon_{bw}$=0.424 which is a range wherein linearity is acceptable in the case of ×2 speed. That is to say, Ps1/Pbw1>Ps2/Pbw2 holds. This is because a condition such as Ps≦Pbw is preferable in the case of ×2 speed or faster as described above though a condition such as Ps>Pbw is required in the case of ×1 speed. Similarly, $\epsilon_{ps1}/\epsilon_{bw1}>\epsilon_{ps2}/\epsilon_{bw2}$ holds. Note that the number of the suffix of $\epsilon$, Ps, and Pbw represents recording speed.

Note that, additionally, a condition such as Ps>Pbw is required in the case of ×1 speed, but a condition such as Ps≦Pbw is preferable in the case of ×2 speed or faster, so Ps somewhat differs in the cases of ×1 speed and ×2 speed, but the relation of Pbw1<Pbw2 holds, and $\epsilon_{bw1}>\epsilon_{bw2}$ also holds.

As described above, the power levels of $\epsilon_{bw}$ and Pbw are increased, and the power levels of $\epsilon_{ps}$ and Ps are decreased, whereby the relation between the asymmetry value or β value and main power Pw can be represented with a linear straight line while suppressing influence as to DCJ.

At this time, in the case of a recording speed of ×2 or faster, Ps≦Pbw holds, so $\epsilon_{ps}\leq\epsilon_{bw}$ is preferable. Note that in the case of ×1 speed recording, Ps>Pbw is stipulated with the BD standard, but of this range an advantage can be obtained by decreasing the power level of Ps as much as possible.

Further, when taking a recording speed into consideration, an advantage can be obtained in a case wherein Ps1/Pbw$_1$>Ps2/Pbw2, $\epsilon_{ps1}/\epsilon_{bw1}>\epsilon_{ps2}/\epsilon_{bw2}$, Pbw1<Pbw2, and $\epsilon_{bw1}<\epsilon_{bw2}$ hold.

DESCRIPTION OF AN EMBODIMENT OF THE INVENTION

Figure 13:
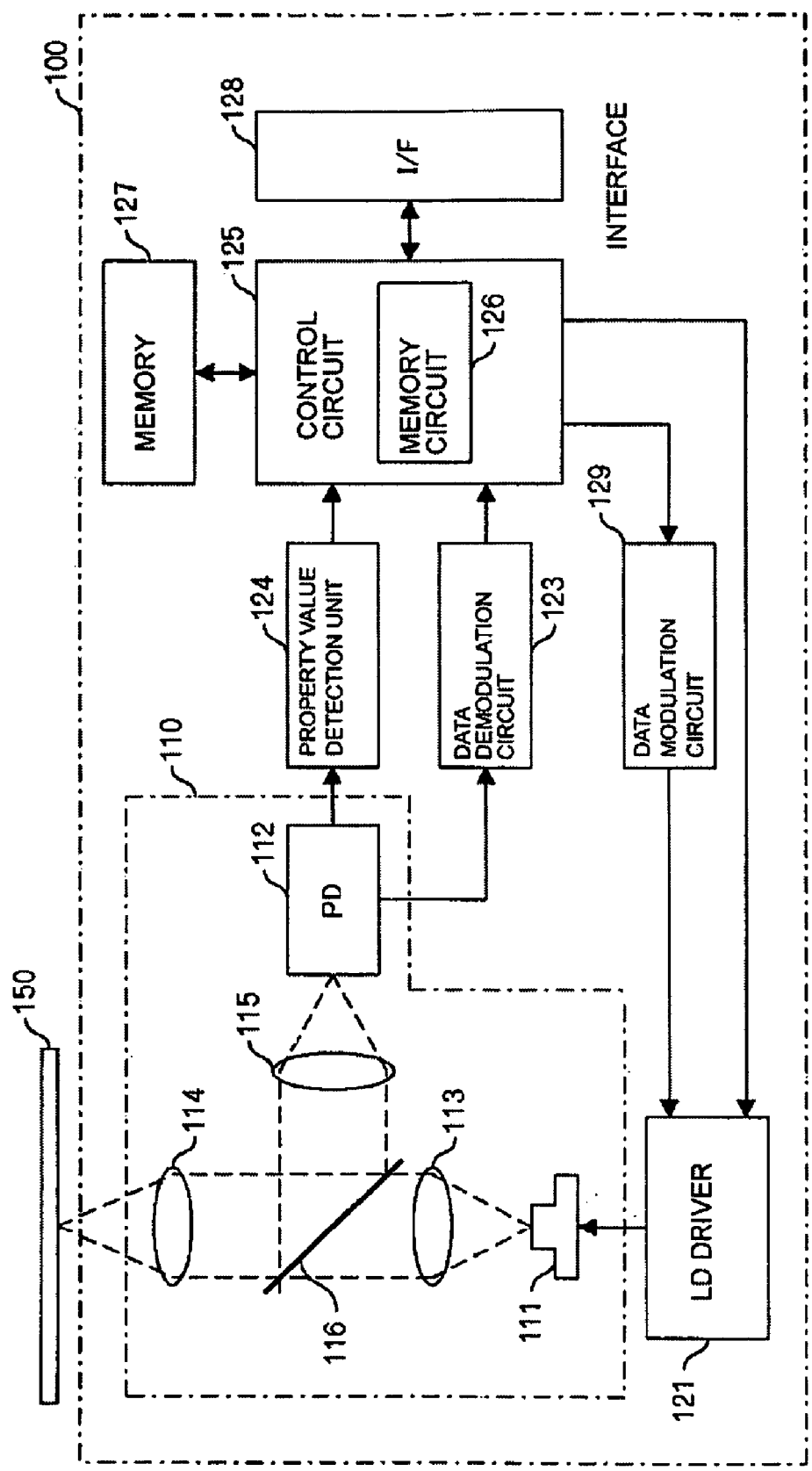
FIG. 13 is a functional block diagram according to an embodiment of the present invention.

A functional block diagram shown in FIG. 13 of a drive system according to an embodiment of the present invention will be described. A drive system according to an embodiment of the present invention includes an optical disc recording/playback device 100, an input/output system (not shown) including a display unit such as a television receiver, and an operating unit such as a remote controller.

The optical disc recording/playback device 100 includes memory 127 storing data in the middle of processing, data of processing results, reference data in processing, and so forth, a control circuit 125 configured of a central processing unit (hereafter, abbreviated as "CPU") including a memory circuit 126 in which a program for performing processing described below may be recorded, an interface unit (hereafter, abbreviated as "I/F") 128 which is an interface with an input/output system, a property value detection unit 124 for detecting the maximum amplitude level or the minimum amplitude level or the like of a RF signal which is a playback signal, a data demodulation circuit 123 for performing processing for decoding whether to read which of 2 T through 8 T codes (e.g., in the case of the BD standard, 9 T which is a synchronizing code is also distinguished. Also, in the case of the HD-DVD standard, 2 T through 11 T codes and 13 T which is a synchronizing code are distinguished) from a RF signal which is a playback signal, a pickup unit 110, a data modulation circuit 129 for subjecting data to be recorded output from the control circuit 125 to predetermined modulation, and outputting this to a laser diode (hereafter, abbreviated as "LD") driver 121, and a rotation control unit of an optical disc 150, a servo control unit for the motor and the pickup unit 110 (not shown), and so forth.

Also, the pickup unit 110 includes an objective lens 114, beam splitter 116, detection lens 115, collimator lens 113, LD 111, and photo detector (hereafter, abbreviated as "PD") 112. With the pickup unit 110, an actuator operates in response to control of the unshown servo control unit, and focusing and tracking are performed.

The control unit 125 is connected to the memory 127, property value detection unit 124, I/F 128, LD driver 121, data modulation circuit 129, unshown rotation control unit and servo control unit, and so forth. Also, the property value detection unit 124 is connected to the PD 112, control circuit 125, and so forth. The LD driver 121 is connected to the data modulation circuit 129, control circuit 125, and LD 111. The control circuit 125 is also connected to the input/output system through the I/F 128.

Next, description will be made regarding processing overview in the case of subjecting the optical disc 150 to data recording. First, the control circuit 125 controls the data modulation circuit 129 to subject data to be recorded in the optical disc 150 to predetermined modulation processing, and the data modulation circuit 129 outputs the data after the modulation processing to the LD driver 121. The LD driver 121 drives the LD 111 using the received data to output a laser beam in accordance with the specified recording conditions (strategy and parameters). The laser beam is irradiated onto the optical disc 150 through the collimator lens 113, beam splitter 116, and objective lens 114, where a mark and space are formed on the optical disc 150.

Also, description will be made regarding processing overview in the case of playing the data recorded in the optical disc 150. In response to the instructions from the control circuit 125, the LD driver 121 drives the LD 111 to output a laser beam. The laser beam is irradiated onto the optical disc 150 through the collimator lens 113, beam splitter 116, and objective lens 114. The reflected beam from the optical disc 150 is input to the PD 112 through the objective lens 114, beam splitter 116, and detection lens 115. The PD 112 converts the reflected beam from the optical disc 150 into an electric signal, and outputs this to the property value detection unit 124 and so forth. The data modulation circuit 123 and so forth subject the output playback signal to predetermined decoding processing, outputs the decoded data to the display unit of the input/output system through the control circuit 125 and I/F 128, and displays the playback data. The property value detection unit 124 is not employed for ordinary playback.

Figure 14:
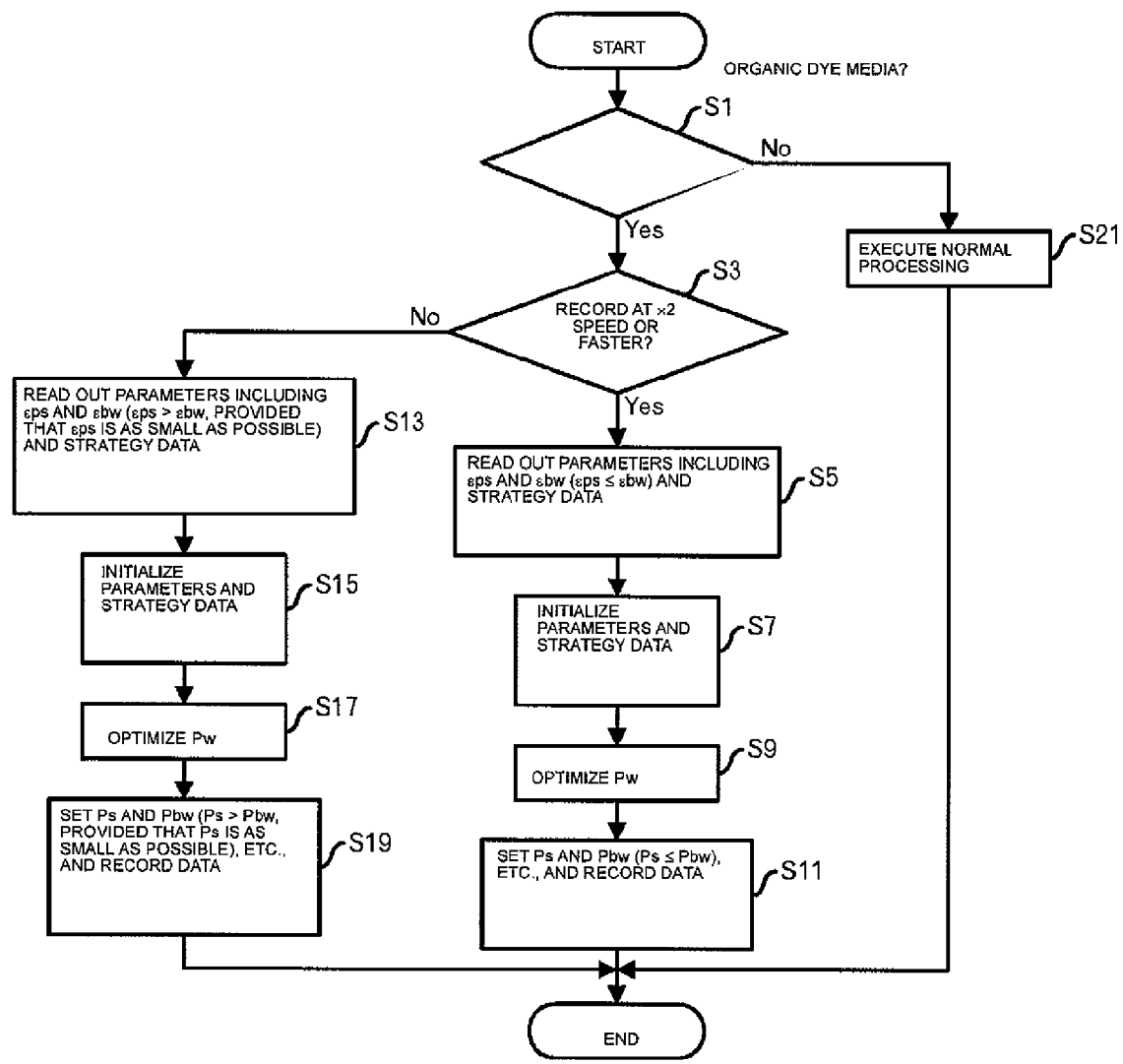
FIG. 14 is a diagram illustrating a processing flow according to an embodiment of the present invention.

Next, description will be made regarding the operation of the optical disc recording/playback device 100 with reference to FIG. 14. First, the control circuit 125 plays a media ID recorded in the optical disc 150 using the PD 112 and data modulation circuit 123, obtains the reflectivity of the optical disc 150 by comparing the played media ID and the media ID of an optical disc including a recording layer employing organic dye registered in the memory 127 beforehand, or by the property value detection unit 124 and so forth, determines whether or not the relevant reflectivity is a predetermined value, thereby determining whether or not the optical disc 150 to be subjected to data recording this time is an optical disc including a recording layer employing organic dye (step S1). In a case wherein the optical disc 150 to be subjected to data recording this time is not an optical disc including a recording layer employing organic dye, processing not according to the present embodiment but rather according to normal processing is executed (step S21), and the processing ends.

On the other hand, in a case wherein determination is made that the optical disc 150 to be subjected to data recording this time is an optical disc including a recording layer employing organic dye, the control circuit 125 determines whether or not a recording speed is ×2 or faster based on the instructions or the like from a user, which were input through the I/F 128 (step S3). In a case wherein data recording is performed at ×2 speed or faster, the control circuit 125 reads out parameters and various types of strategy, for example, including $\epsilon_{ps}$ and $\epsilon_{bw}$ having the relation such as $\epsilon_{ps} \leq \epsilon_{bw}$ from the memory 127 or optical disc 150 (step S5), initializes the relevant parameters and various types of strategy data (step S7). With regard to the value of power such as the space formation power Ps, and bias power Pbw depending on the main power Pw, the LD driver 121 and so forth are initialized based on the initial value of the main power Pw. Note that parameters for ×1 speed are not employed here, but the parameters for a recording speed of ×2 or faster are set as compared to the parameters for ×1 speed, which includes the relations described above.

Subsequently, known processing is executed to optimize the main power Pw (step S9). Note that, at this time, the property value detection unit 124 detects the property values for calculating an asymmetry value or $\epsilon$ value, and outputs these to the control circuit 125. Subsequently, upon the main power Pw being optimized, the control circuit 125 sets $\epsilon_{ps}$ and $\epsilon_{bw}$ satisfying the space formation power Ps and bias power Pbw corresponding to the optimized main power Pw, i.e., Ps≦Pbw, and executes data recording (step S11).

Such processing yields advantages such as described above, and further, with the WOPC or the like, control of the main power Pw can be performed appropriately.

On the other hand, in the case of executing data recording at ×1 speed, the control circuit 125 reads out parameters and various types of strategy, for example, including $\epsilon_{ps}$ and $\epsilon_{bw}$ having the relation such as $\epsilon_{ps} \leq \epsilon_{bw}$ from the memory 127 or optical disc 150 (step S13), initializes the relevant parameters and various types of strategy data (step S15). With regard to the value of power such as the space formation power Ps, and bias power Pbw depending on the main power Pw, the LD driver 121 and so forth are initialized based on the initial value of the main power Pw. Here, let us say that $\epsilon_{ps}$ is a value as small as possible. Note that parameters for ×2 speed are not employed here, but the parameters for a recording speed of ×1 are set as to the parameters for ×2 speed or faster, which includes the relations described above.

Subsequently, known processing is executed to optimize the main power Pw (step S17). Note that, at this time, the property value detection unit 124 detects the property values for calculating an asymmetry value or β value, and outputs these to the control circuit 125. Subsequently, upon the main power Pw being optimized, the control circuit 125 sets Ps and Pbw satisfying the space formation power Ps and bias power Pbw corresponding to the optimized main power Pw, i.e., Ps>Pbw, and executes data recording (step S19). However, let us say that Ps is a value as small as possible.

Such processing yields advantages such as described above, and further, with the WOPC or the like, control of the main power Pw can be performed appropriately.

Figure 15:
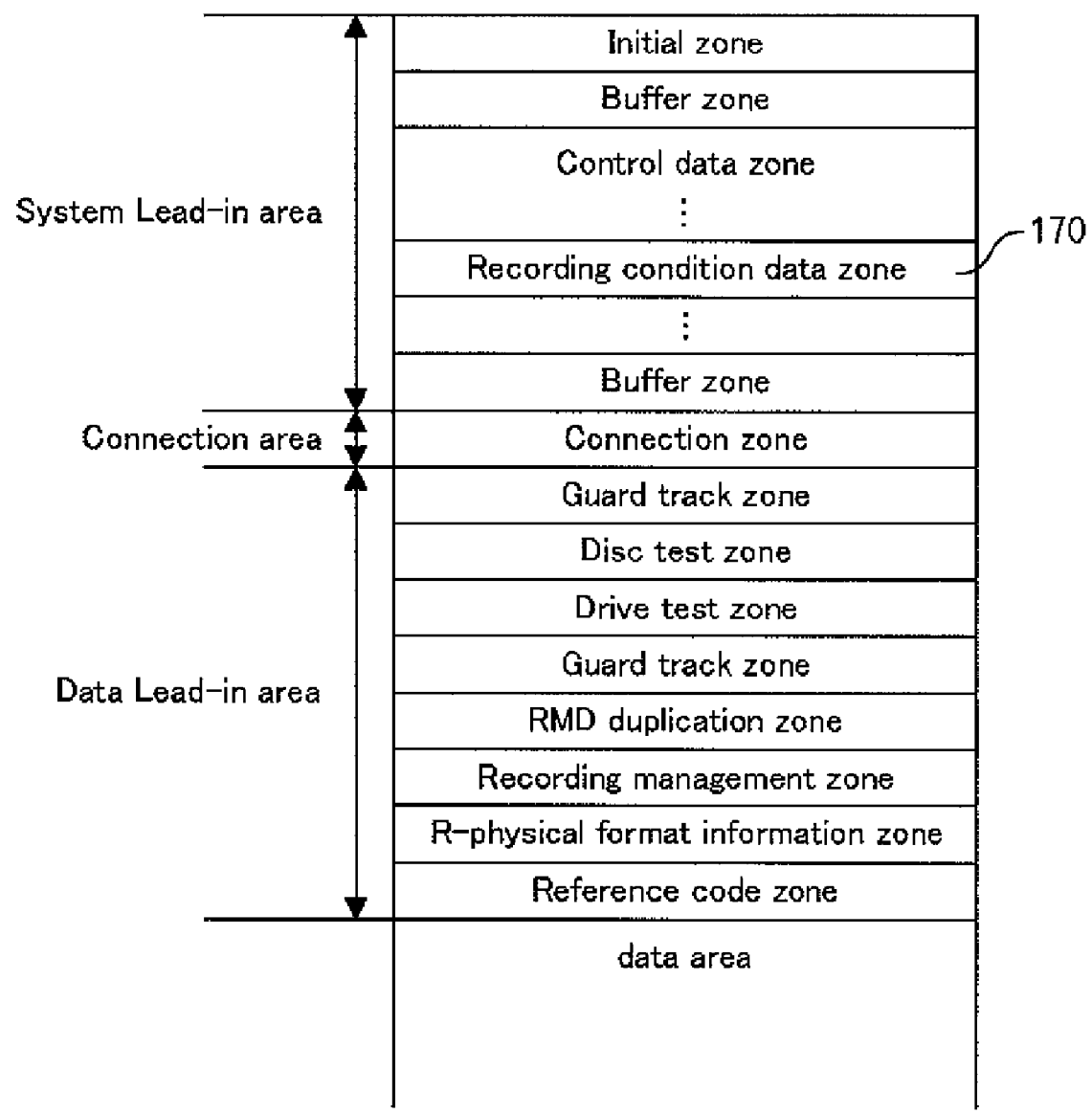
FIG. 15 is a diagram illustrating a data structure stored in an optical disc.

Note that $\epsilon_{ps}$ and $\epsilon_{bw}$ for ×1 speed recording and ×2 or faster speed recording are stored in the memory 127 or optical disc 150 in some cases. In the case of holding these in the optical disc 150, these may be held in Lead-in area such as shown in FIG. 15. Lead-in area may be principally divided into a system Lead-in area, a connection area, and data Lead-in area, and the system Lead-in area may include an initial zone, buffer zone, control data zone, and buffer zone. Also, the connection area may include a connection zone. Further, the data Lead-in area may include a guard track zone, disc test zone, drive test zone, guard track zone, RMD duplication zone, recording management zone, R-physical format information zone, and reference code zone. With the present embodiment, an arrangement is made wherein the control data zone of the system Lead-in area includes a recording condition data zone 170. For example, $\epsilon_{ps}$, $\epsilon_{bw}$, and so forth are held in the recording condition data zone 170.

The embodiment of the present invention has been described so far, but the present invention is not restricted to this. For example, the functional block diagram shown in FIG. 13 is shown for describing the embodiment so there is a case wherein the functional block is not necessarily identical to an actual circuit or module configuration. Also, with regard to the processing flow as well, processing orders may be interchanged, or may be executed in parallel as long as the processing results are the same.

Note that not only the techniques described above but also other techniques may be employed to increase the tilt of a straight line representing the relation between the asymmetry value or β value and the main power Pw, and also improve linearity thereof. Examples of this technique include a technique wherein the top pulse length Ttop is lengthened regarding only short marks (e.g., 2 T, 3 T, 4 T, etc.), a technique wherein the last pulse length Tlp is lengthened regarding code of 3 T alone or 4 T or more, and a technique wherein Ttop is shortened, thereby preventing a short mark from being written, similar to reduction in Ps, to increase the tilt of β at the time of fluctuation of Pw. This is because a contribution level of a short mark having little influence as to 18 H fluctuation is enhanced, the fluctuation of the average level of a RF signal is increased as compared to 18 H fluctuation as to the main power Pw, thereby increasing the β value in a case wherein the main power Pw is small, and decreasing the β value in a case wherein the main power Pw is great, and accordingly, the tilt of the straight line representing the relation between the asymmetry value or β value and the main power Pw should be increased.

The structure and the operation of the present invention are not limited to the above descriptions. Various modifications may be made without departing from the spirit and scope of the present invention. While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. An optical disc recording method comprising:
   determining that an optical disc to be recorded is an optical disc including a recording layer comprising organic dye; and
   controlling a laser in pulses constituted by recording pulses for recording marks and space formation pulses for forming spaces between marks such that space formation power Ps of the space formation pulses is smaller than separate bias power Pbw of the recording pulses and is greater than read power Pr for playing the recording marks so as to correlate asymmetry or β values and main power Pw of the recording pulses whereby main power Pw is controlled using asymmetry or β values, Pbw being defined as power which is smaller than main power Pw and which is used between pulses of main power Pw within individual recording marks having a length of 3 T or more.

2. The optical disc recording method according to claim 1, wherein said controlling is executed in a case wherein a recording speed is ×2 or faster.

3. An optical disc recording/playback device comprising:
   a determining unit configured to determine whether or not an optical disc to be written is an optical disc including a recording layer comprising organic dye; and
   a control unit configured to control a laser in pulses constituted by recording pulses for recording marks and space formation pulses for forming spaces between marks such that space formation power Ps of the space formation pulses is smaller than separate bias power Pbw of the recording pulses and is greater than read power Pr for playing the recording marks so as to correlate asymmetry or β values and main power Pw of the recording pulses whereby main power Pw is controlled using asymmetry or β values, Pbw being defined as power which is smaller than main power Pw and which is used between pulses of main power Pw within individual recording marks having a length of 3 T or more, when determination is made that said optical disc includes a recording layer comprising organic dye.

4. The optical disc recording/playback device according to claim 3, wherein said control unit is configured to operate when a recording speed is ×2 or faster.

5. An optical disc including a recording layer comprising organic dye, wherein data are recorded in the recording layer by a laser controlled in pulses constituted by recording pulses for recording marks and space formation pulses for forming spaces between marks, said optical disc stored therein parameters satisfying the following relation $$\epsilon_{ps} < \epsilon_{bw},$$

where $\epsilon_{ps}$ is a parameter for setting space formation power Ps of the space formation pulses, and $\epsilon_{bw}$ is a parameter for setting separate bias power Pbw of the recording pulses,
   wherein Ps is smaller than Pbw and is greater than read power Pr for playing the recording marks so as to correlate asymmetry or β values and main power Pw of the recording pulses whereby main power Pw is controlled using asymmetry or β values, Pbw being defined as power which is smaller than main power Pw and which is used between pulses of main power Pw within individual recording marks having a length of 3 T or more.

6. The optical disc according to claim 5, wherein said parameter $\epsilon_{ps}$ and said parameter $\epsilon_{bw}$ are parameters employed at a recording speed of ×2 or faster.

7. The optical disc according to claim 5, wherein said parameter $\epsilon_{ps}$ and said parameter $\epsilon_{bw}$ are parameters to be multiplied by Pw.

8. An optical disc recording method comprising:
   determining that an optical disc to be recorded is an optical disc including a recording layer comprising organic dye, wherein data are recorded in the recording layer by a laser controlled in pulses constituted by recording pulses for recording marks and space formation pulses for forming spaces between marks;
   recording data in the optical disc by employing space formation power $Ps_1$ of the space formation pulses at a recording speed of ×1 and separate bias power $Pbw_1$ of the recording pulses at a recording speed of ×1, in a case wherein determination is made that said optical disc is an optical disc including a recording layer employing organic dye, and also a recording speed is ×1, $Pbw_1$ being defined as power which is smaller than main power Pw and which is used between pulses of main power Pw within individual recording marks having a length of 3 T or more; and
   recording data in the optical disc by employing space formation power $Ps_2$ of the space formation pulses at a recording speed of ×2 or faster and separate bias power $Pbw_2$ of the recording pulses at a recording speed of ×2 or faster, in a case wherein determination is made that said optical disc is an optical disc including a recording layer comprising organic dye, and also a recording speed is ×2 or faster, $Pbw_2$ being defined as power which is smaller than main power Pw and which is used between pulses of main power Pw within individual recording marks having a length of 3 T or more, wherein space formation power $Ps_2$ is smaller than $Pbw_2$ and is greater than read power Pr for playing the recording marks so as to correlate asymmetry or β values and main power Pw of the recording pulses whereby main power Pw is controlled using asymmetry or β values;
   wherein said $Ps_1$, $Pbw_1$, $Ps_2$, and $Pbw_2$ satisfy the condition $$Ps_1/Pbw_1 > Ps_2/Pbw_2.$$

9. An optical disc recording/playback device comprising:
   a determining unit configured to determine whether or not an optical disc to be written is an optical disc including a recording layer comprising organic dye, wherein data are recorded in the recording layer by a laser controlled in pulses constituted by recording pulses for recording marks and space formation pulses for forming spaces between marks; and a control unit configured to control parameters for writing to the optical disc so as to satisfy the following relation $$Ps_1/Pbw_1 > Ps_2/Pbw_2$$

where $Ps_1$ is space formation power of the space formation pulses at a recording speed of ×1, $Pbw_1$ is separate bias power of the recording pulses at a recording speed of ×1, $Ps_2$ is space formation power of the space formation pulses at a recording speed of ×2 or faster, and $Pbw_2$ is separate bias power of the recording pulses at a recording speed of ×2 or faster, when determination is made that said optical disc is an optical disc including a recording layer comprising organic dye, wherein $Ps_2$ is smaller than $Pbw_2$ and is greater than read power Pr for playing the recording marks so as to correlate asymmetry or β values and main power Pw of the recording pulses whereby main power Pw is controlled using asymmetry or β values, each of $Pbw_1$ and $Pbw_2$ being defined as power which is smaller than main power Pw and which is used between pulses of main power Pw within individual recording marks having a length of 3 T or more.

10. An optical disc including a recording layer comprising organic dye wherein data are recorded in the recording layer by a laser controlled in pulses constituted by recording pulses for recording marks and space formation pulses for forming spaces between marks, said optical disc storing the parameters satisfying the following relation $$\epsilon_{ps1}/\epsilon_{bw1} \geq \epsilon_{ps2}/\epsilon_{bw2},$$

where $\epsilon_{ps1}$ is a parameter for setting space formation power $Ps_1$ of the space formation pulses at a recording speed of ×1, $\epsilon_{bw1}$ is a parameter for setting separate bias power $Pbw_1$ of the recording pulses at a recording speed of ×1, $\epsilon_{ps2}$ is a parameter for setting space formation power $Ps_2$ of the space formation pulses at a recording speed of ×2 or faster, and $\epsilon_{bw2}$ is a parameter for setting separate bias power $Pbw_2$ of the recording pulses at a recording speed of ×2 or faster, wherein $Ps_2$ is smaller than $Pbw_2$ and is greater than read power Pr for playing the recording marks so as to correlate asymmetry or β values and main power Pw of the recording pulses whereby main power Pw is controlled using asymmetry or β values, each of $Pbw_1$ and $Pbw_2$ being defined as power which is smaller than main power Pw and which is used between pulses of main power Pw within individual recording marks having a length of 3 T or more.

11. An optical disc recording method comprising:

determining that an optical disc to be recorded is an optical disc including a recording layer comprising organic dye, wherein data are recorded in the recording layer by a laser controlled in pulses constituted by recording pulses for recording marks and space formation pulses for forming spaces between marks;

performing data recording employing bias power $Pbw_1$ of the recording pulses at a recording speed of ×1, in a case wherein determination is made that said optical disc is an optical disc including a recording layer comprising organic dye, and also a recording speed is ×1, $Pbw_1$ being defined as power which is smaller than main power Pw and which is used between pulses of main power Pw within individual recording marks having a length of 3 T or more; and performing data recording employing bias power $Pbw_2$ of the recording pulses at a recording speed of ×2 or faster, in a case wherein determination is made that said optical disc is an optical disc including a recording layer comprising organic dye, and also a recording speed is ×2 or faster, $Pbw_2$ being defined as power which is smaller than main power Pw and which is used between pulses of main power Pw within individual recording marks having a length of 3 T or more, wherein space formation power $Ps_2$ of the space formation pulses at a recording speed of ×2 or faster is smaller than $Pbw_2$ and is greater than read power Pr for playing the recording marks so as to correlate asymmetry or β values and main power Pw of the recording pulses whereby main power Pw is controlled using asymmetry or β values;

wherein said $Pbw_1$ and $Pbw_2$ are set so as to satisfy the following relation $$Pbw_1 < Pbw_2.$$

12. An optical disc recording/playback device comprising:

a determining unit configured to determine whether or not an optical disc to be written is an optical disc including a recording layer comprising organic dye, wherein data are recorded in the recording layer by a laser controlled in pulses constituted by recording pulses for recording marks and space formation pulses for forming spaces between marks; and a control unit configured to control so as to satisfy the following relation $$Pbw_1 < Pbw_2,$$

where $Pbw_1$ of the recording pulses is bias power at a recording speed of ×1, and $Pbw_2$ of the recording pulses is bias power at a recording speed of ×2 or faster, when determination is made that said optical disc includes a recording layer comprising organic dye, wherein space formation power $Ps_2$ of the space formation pulses at a recording speed of ×2 or faster is smaller than separate $Pbw_2$ and is greater than read power Pr for playing the recording marks so as to correlate asymmetry or β values and main power Pw of the recording pulses whereby main power Pw is controlled using asymmetry or β values, each of $Pbw_1$ and $Pbw_2$ being defined as power which is smaller than main power Pw and which is used between pulses of main power Pw within individual recording marks having a length of 3 T or more.

13. An optical disc including a recording layer comprising organic dye wherein data are recorded in the recording layer by a laser controlled in pulses constituted by recording pulses for recording marks and space formation pulses for forming spaces between marks, said optical disc storing the parameters satisfying the following relation $$\epsilon_{bw1} < \epsilon_{bw2},$$

where $\epsilon_{bw1}$ is a parameter for setting bias power $Pbw_1$ of the recording pulses at a recording speed of ×1, and $\epsilon_{bw2}$ is a parameter for setting bias power $Pbw_2$ of the recording pulses at a recording speed of ×2 or faster, each of $Pbw_1$ and $Pbw_2$ being defined as power which is smaller than main power Pw and which is used between pulses of main power Pw within individual recording marks having a length of 3 T or more, wherein space formation power $Ps_2$ of the space formation pulses at a recording speed of ×2 or faster is smaller than $Pbw_2$ and is greater than read power Pr for playing the recording marks so as to correlate asymmetry or β values and main power Pw of the recording pulses whereby main power Pw is controlled using asymmetry or β values.

* * * * *